(12) United States Patent
Natori

(10) Patent No.: US 7,002,323 B2
(45) Date of Patent: Feb. 21, 2006

(54) SWITCHING POWER SUPPLY CIRCUIT CAPABLE OF REDUCING SWITCHING LOSS AND CONTROL METHOD USED THEREIN

(75) Inventor: Masaki Natori, Yamanashi (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 10/840,799

(22) Filed: May 7, 2004

(65) Prior Publication Data

US 2005/0041440 A1    Feb. 24, 2005

(30) Foreign Application Priority Data

May 7, 2003    (JP)    ............................. 2003-129511

(51) Int. Cl.
*G05F 1/40*    (2006.01)
(52) U.S. Cl. ...................... 323/225; 323/284; 323/290; 323/235; 323/259
(58) Field of Classification Search ................ 323/222, 323/223, 224, 225, 235, 259, 271, 272, 282, 323/284, 290, 319, 334, 351
See application file for complete search history.

(56) References Cited

U.S. PATENT DOCUMENTS 5,066,900 A * 11/1991 Bassett ........................ 323/224
6,518,739 B1 * 2/2003 Wald et al. .................. 323/351
6,690,143 B1 * 2/2004 Lin et al. ..................... 323/222

2004/0119447 A1 * 6/2004 Kato ........................... 323/222

FOREIGN PATENT DOCUMENTS

| JP | 6-311738 | 11/1994 |
| JP | 7-203673 | 8/1995 |
| JP | 10-500834 | 1/1998 |
| JP | 2002-95243 | 3/2002 |
| JP | 2003-9517 | 1/2003 |

OTHER PUBLICATIONS

Japanese Office Action dated Jul. 19, 2005 with English translation of pertinent portions.

* cited by examiner

*Primary Examiner*—Jessica Han
(74) *Attorney, Agent, or Firm*—Whitham, Curtis & Christofferson, PC

(57) ABSTRACT

When a switching element (33) changes from ON state into OFF state, a capacitor (35) is charged. The rising of the voltage of the switching element becomes dull relative to the falling of the current flowing in the switching element. When the switching element changes from OFF state into ON state, because a diode (34) has been in ON state, switching of the switching element is zero-voltage switching. When an auxiliary switching element (39) changes from ON state into OFF state, an auxiliary capacitor (41) is charged. The rising of the voltage of the auxiliary switching element becomes dull relative to the failing of the current flowing in the auxiliary switching element. When the auxiliary switching element changes from OFF state into ON state, because an auxiliary diode (40) has been in ON state, switching of the auxiliary switching element is zero-voltage switching. Thus the switching loss is reduced

8 Claims, 10 Drawing Sheets

FIG. 5A PRIOR ART — MAIN SWITCH VOLTAGE $V_{SW1}$

FIG. 5B PRIOR ART — MAIN SWITCH CURRENT $I_{SW1}$

FIG. 5C PRIOR ART — AUXILIARY SWITCH VOLTAGE $V_{SW2}$

FIG. 5D PRIOR ART — AUXILIARY SWITCH CURRENT $I_{SW2}$

FIG. 5E PRIOR ART — TRANSFORMER EXCITING CURRENT

FIG. 5F PRIOR ART — DIODE CURRENT $I_{D1}$

FIG. 5G PRIOR ART — CHOKE CURRENT $I_{L1}$

SWITCHING POWER SUPPLY CIRCUIT CAPABLE OF REDUCING SWITCHING LOSS AND CONTROL METHOD USED THEREIN

BACKGROUND OF THE INVENTION

1. Field of the Invention

The present invention relates to a switching power supply circuit and a control method used therein. The present invention relates to a switching power supply circuit suitable for an electronic device or the like, for example, driven by a power supply voltage obtained by boosting a relatively low voltage such as that of a battery, and to a control method used in the power supply circuit.

2. Description of the Related Art

In recent years, attendant upon decreases in size of electronic devices, power supply units to be included in the respective electronic devices are also required to be decreased in size. In many cases, a switching power supply circuit is used as such a power supply unit. In general, decreasing the size of such a switching power supply circuit is coped with by raising its switching frequency. However, raising the switching frequency brings about an increase in the switching loss in a switching element and therefore an increase in the heat generation quantity. Thus it is required to increase the size of a radiator or the like to be combined with the switching element. This is an obstacle to decreasing in size. For this reason, it is requested to reduce the switching loss in such a switching element by another method than switching frequency.

Switching power supply circuits are classified into buck type, boost type, and buck-boost type. Of them, a switching power supply circuit of boost type includes a DC power supply unit such as a battery, a choke coil, a switching element a rectifier diode and a smoothing capacitor. In the boost type switching power supply circuit, electromagnetic energy supplied from the DC power supply unit is stored in the choke coil when the switching element is in ON state. Subsequently, when the switching element is turned into OFF state, counter electromotive force generated in the choke coil is superimposed on the output voltage of the DC power supply unit. The superimposed voltage is applied to the smoothing capacitor through the rectifier diode. As a result, the output voltage of the DC power supply unit is boosted.

As shown in FIG. 1, a switching power supply circuit of this kind is made up of a battery 1, a choke coil 2, a switching element 3, a diode 4, a capacitor 5, a rectifier diode 6, a smoothing capacitor 7, and a controller 8. A load Z is connected to the smoothing capacitor 7 in parallel. In this example, the switching element 3 is realized by an n-channel MOSFET. Hereinafter, n-channel MOSFET may be referred to as nMOS.

In this switching power supply circuit, electromagnetic energy supplied from the battery 1 is stored in the choke coil 2 when the switching element 3 is in ON state. Subsequently, when the switching element 3 is turned into OFF state, counter electromotive force generated in the choke coil 2 is superimposed on the output voltage $V_E$ of the battery 1. The superimposed voltage is applied to the smoothing capacitor 7 through the rectifier diode 6. As a result, the output voltage $V_E$ of the battery 1 is boosted to be an output voltage $V_N$, which is applied to the load Z.

The controller 8 monitors the output voltage $V_N$. The controller 8 controls the time width of ON state of the switching element 3 in accordance with the output voltage $V_N$ to keep the output voltage $V_N$ substantially at a set value.

However, this switching power supply circuit has the following problem. That is, loss is generated when the switching element 3 is turned on or off. For example, in case of turning the switching element 3 on, immediately before the turning-on operation, the capacitor 5 is a parasitic capacitance to the switching element 3 and has been charged by substantially the same voltage as the output voltage $V_N$. Charges stored in the capacitor 5 are released through the switching element 3 when the switching element 3 is turned on. At this time, electromagnetic energy stored in the capacitor 5 is consumed by the switching element 3. This causes power loss.

In addition, immediately before the switching element 3 is turned on, load current is flowing through the rectifier diode 6 in the forward direction. When the switching element 3 is turned on in this state, counter electromotive force is applied from the smoothing capacitor 7 to the rectifier diode 6. Thus, recovery current flows in the rectifier diode 8 and there is no restriction of the recovery current. As a result, a large amount of loss and a large amount of noise are generated. Even if the rectifier diode 6 is realized by a fast recovery diode, the recovery current can not completely be eliminated though the recovery current can be reduced.

As another switching power supply circuit than the above-described one, for example, the following switching power supply is known.

JP-A-6-311738 discloses a boost-chopper type switching power supply. As shown in FIG. 2, this switching power supply is made up of a battery 1, a choke coil 2, a main switching element 3, a diode 4, a capacitor 5, a rectifier diode 6, a smoothing capacitor 7, a controller 8A, a choke coil 9, diodes 10 and 11, an auxiliary switching element 12, and a diode 13. A load Z is connected to the smoothing capacitor 7 in parallel.

In this switching power supply, as shown in FIG. 3, the auxiliary switching element 12 is turned into ON state immediately before the main switching element 3 is turned into ON state. The auxiliary switching element 12 is turned into OFF state immediately after the main switching element 3 is turned into ON state. First, when the auxiliary switching element 12 is turned into ON state, the rising of the current flowing in the auxiliary switching element 12 is made dull by the choke coil 9. This reduces the switching loss when the auxiliary switching element 12 changes from OFF state into ON state, Next, when the current flowing in the choke coil 9 rises to be equal to the current in the choke coil 2, charges in the capacitor 5 are extracted by resonance between the choke coil 9 and the capacitor 6. When the discharge of the capacitor 5 is completed, the diode 4 is turned into ON state. Because the main switching element 3 is turned on in the period of the ON state of the diode 4, switching of the main switching element 3 is zero-voltage switching and thus the switching loss is reduced.

However, when the auxiliary switching element 12 changes from OFF state into ON state, the voltage between both ends of the auxiliary switching element 12 sharply rises due to electromagnetic energy stored in the choke coil 9. Therefore, switching loss is generated in the auxiliary switching element 12. Next, the electromagnetic energy stored in the choke coil 9 is released through the current path of the main switching element 3, the choke coil 9, and the diode 10.

As apparent from the above description, this switching supply has a problem that switching loss is generated when the auxiliary switching element 12 is turned off. If a capacitor is connected to the auxiliary switching element 12 in parallel, the rising of the voltage between both ends of the auxiliary switching element 12 can be made dull. However, because the capacitor is discharged when the auxiliary switching element 12 is turned into ON state, switching loss is generated.

Next, JP-A-7-203673 discloses a switching power supply device as shown in FIG. 4. Referring to FIG. 4, the switching power supply device is made up of a battery 1, a choke coil 2, a main switching element 3, a diode 4, a capacitor 5, a rectifier diode 6, a smoothing capacitor 7, a transformer 21, an auxiliary switching element 22, a diode 23, and capacitors 24 and 25.

FIGS. 5A to 5G show current or voltage waveforms at parts of FIG. 4. FIG. 5A shows the main switch voltage $V_{sw1}$ of the main switching element 3. FIG. 5B shows the main switch current $I_{SW1}$ flowing in the main switching element 3. FIG. 5C shows the auxiliary switch voltage $V_{SW2}$ of the auxiliary switching element 22. FIG. 5D shows the auxiliary switch current $I_{SW2}$ flowing in the auxiliary switching element 22. FIG. 5E shows the exciting current of the transformer 21. FIG. 5F shows the diode current $I_{D1}$ flowing in the rectifier diode 6. FIG. 5G shows the choke current $I_{L1}$ flowing in the choke coil 2.

In this switching power supply device, as shown in FIGS. 5A to 5G, when the main switching element 3 is turned into ON state at time to the voltage $V_E$ of the battery 1 is applied to the series circuit of the choke coil 2 and the primary winding n1 of the transformer 21. At this time, because the auxiliary switching element 22 is in OFF state, no current flows in the secondary winding n2 of the transformer 21. Therefore, the transformer 21 is equivalent to its exciting inductance and the same operation as that of the boost-chopper type switching power supply of FIG. 2 is performed.

When the main switching element 3 is turned into OFF state at time t1, a flyback voltage is generated on the transformer 21 and the capacitor 25 is charged through the diode 23. The voltage of the secondary winding n2 of the transformer 21 is clamped by the voltage of the capacitor 25 so that the current of the secondary winding n2 of the transformer 21 reduces linearly. At this time, the current $I_{L1}$ of the choke coil 2 is supplied to a load (not shown) through the diode 6.

The current of the transformer 21 becomes zero at time t2. At this time, because the auxiliary switching element 22 is in OFF state, no current flows in the secondary winding n2 of the transformer 21. Therefore, the transformer 21 again becomes equivalent to its exciting inductance so as to start resonance with the capacitors 5 and 24. At this time, the resonance currents flow in the loop of the capacitor 5, the diode 6, and the capacitor 7, and the loop of the capacitor 24, the transformer 21, and the capacitor 25.

The auxiliary switching element 22 is turned into ON state at time t3. The voltage of the capacitor 25 is applied to the secondary winding n2 of the transformer 21 and the current of the secondary winding n2 of the transformer 21 increases linearly.

When the auxiliary switching element 22 is turned into OFF state at time t4 and no current flows in the secondary winding n2 of the transformer 21, the transformer 21 becomes equivalent to its exciting inductance so as to start resonance with the capacitor 5. At this time, the resonance current flows in the loop of the capacitor 5, the transformer 21, the diode 6, and the capacitor 7 so that the capacitor 5 is discharged. When the voltage of the capacitor 5 reaches zero or its minimum value, the main switching element 3 is turned into ON state. By this, switching of the main switching element 3 becomes zero-voltage switching or soft switching so that the switching loss is reduced considerably. At this time, because the current $I_{D1}$ of the diode 6 has gotten near to zero as shown in FIG. 5F, the recovery noise is reduced that will be generated when the main switching element 3 is turned into ON state next time.

However, the switching power supply device of FIG. 4 has the following problem. That is, after the auxiliary switch current $I_{SW2}$ reaches zero at time t2, the auxiliary switching element 22 is turned into ON state at time t3. Therefore, the auxiliary switching element 22 is turned into ON state when the diode 23 connected to the auxiliary switching element 22 in parallel is in OFF state. This does not bring about zero-voltage switching and therefore switching loss is generated. JP-A-7-203573 does not clearly describe the work of the diode 4 in FIG. 4.

By the way, it is thinkable to adopt the following construction in place of the battery 1 in FIG. 2 or 4. That is, in place of the battery 1, there are provided a commercial AC power supply and a rectifier circuit for rectifying the input voltage obtained from the commercial AC power supply to generate a pulsating voltage. In addition, a power factor improvement circuit is provided for controlling the input voltage to be a sine waveform substantially in phase with the input voltage. Even in this case, however, the same switching loss is generated.

SUMMARY OF THE INVENTION

An object of the present invention is to reduce the switching loss of a switching element and thereby to provide a more efficient switching power supply circuit.

Another object of the present invention is to provide a control method used in the switching power supply circuit.

A switching power supply circuit according to the present invention comprises an inductance element for storing electromagnetic energy supplied from a DC power supply unit when a switching element is in ON state. In the switching power supply circuit, counter electromotive force generated in the inductance element when the switching element is turned into OFF state is superimposed on an output voltage of the DC power supply unit, and the superimposed voltage is applied to a smoothing unit through a rectifying unit to boost the output voltage of the DC power supply unit.

According to an aspect of the present invention, the switching power supply circuit further comprises a rectifying element connected to both ends of the switching element such that the forward direction of the rectifying element is reverse to the direction of current flowing in the switching element; a capacitance element connected to both ends of the switching element; and a control circuit. The control circuit allows current to flow through the rectifying element in the forward direction to turn the rectifying element on and discharges the capacitance element before the switching element changes from OFF state into ON state. The control circuit charges the capacitance element and turns the rectifying element off when the switching element changes from ON state into OFF state. The control circuit restricts recovery current flowing from the smoothing unit through the rectifying unit into the switching element when the switching element changes from OFF state into ON state.

The control circuit preferably includes a transformer having a primary winding and a secondary winding. In this case, when current flowing through the switching element flows in the primary winding, the transformer transfers electromagnetic energy stored in the primary winding to the secondary winding. On the other hand, the transformer transfers electromagnetic energy stored in the secondary winding to the primary winding when current flows in the secondary winding. The control circuit preferably further includes a storing unit for storing electromagnetic energy supplied from the secondary winding, the storing unit allowing resonance current to flow between the storing unit and the secondary winding of the transformer; an auxiliary switching element allowing current to flow from the storing unit into the secondary winding of the transformer when the auxiliary switching element is turned into ON state; an auxiliary rectifying element connected to both ends of the auxiliary switching element such that the forward direction of the auxiliary rectifying element is reverse to the direction of current flowing in the auxiliary switching element; an auxiliary capacitance element connected to both ends of the auxiliary switching element; and a controller for alternately ON/OFF-controlling the switching element and the auxiliary switching element in accordance with the output voltage, and setting a dead time period during which both the switching element and the auxiliary switching element are in OFF state.

The switching element is preferably realized by an MOS transistor. In this case, the rectifying element is preferably realized by a parasitic diode of the MOS transistor, and the capacitance element is preferably realized by a parasitic capacitance of the MOS transistor.

The auxiliary switching element is also preferably realized by an MOS transistor. Also in this case, the auxiliary rectifying element is preferably realized by a parasitic diode of the MOS transistor, and the auxiliary capacitance element is preferably realized by a parasitic capacitance of the MOS transistor.

The DC power supply unit may include a rectifier circuit for rectifying an input voltage obtained by a commercial AC power supply to generate a pulsating voltage. In this case, the control circuit preferably further includes a current detecting unit for detecting input current obtained from the commercial AC power supply. On the other hand, in place of the above controller, the control circuit preferably comprises a power factor improvement controller for controlling the ON times of the switching element and the auxiliary switching element on the basis of the pulsating voltage, the output voltage, and the input current so that the input current has a sine waveform substantially in phase with the input voltage.

According to the present invention, a control method used in a switching power supply circuit is provided, in which electromagnetic energy supplied from a DC power supply unit is stored in an inductance element when a switching element is in ON state, counter electromotive force generated in the inductance element when the switching element is turned into OFF state is superimposed on an output voltage of the DC power supply unit, and the superimposed voltage is applied to a smoothing unit through a rectifying unit to boost the output voltage of the DC power supply unit.

In this control method, a rectifying element is connected to both ends of the switching element such that the forward direction of the rectifying element is reverse to the direction of current flowing in the switching element, and a capacitance element is connected to both ends of the switching element. Further in this control method, current is made to flow through the rectifying element in the forward direction to turn the rectifying element on and the capacitance element is discharged before the switching element changes from OFF state into ON state, the capacitance element is charged and the rectifying element is turned off when the switching element changes from ON state into OFF state, and recovery current flowing from the smoothing unit through the rectifying unit into the switching element when the switching element changes from OFF state into ON state, is restricted.

DESCRIPTION OF THE PREFERRED EMBODIMENTS

Preferred embodiments of the present invention will be described with reference to drawings.

[First Embodiment]

Figure 1:
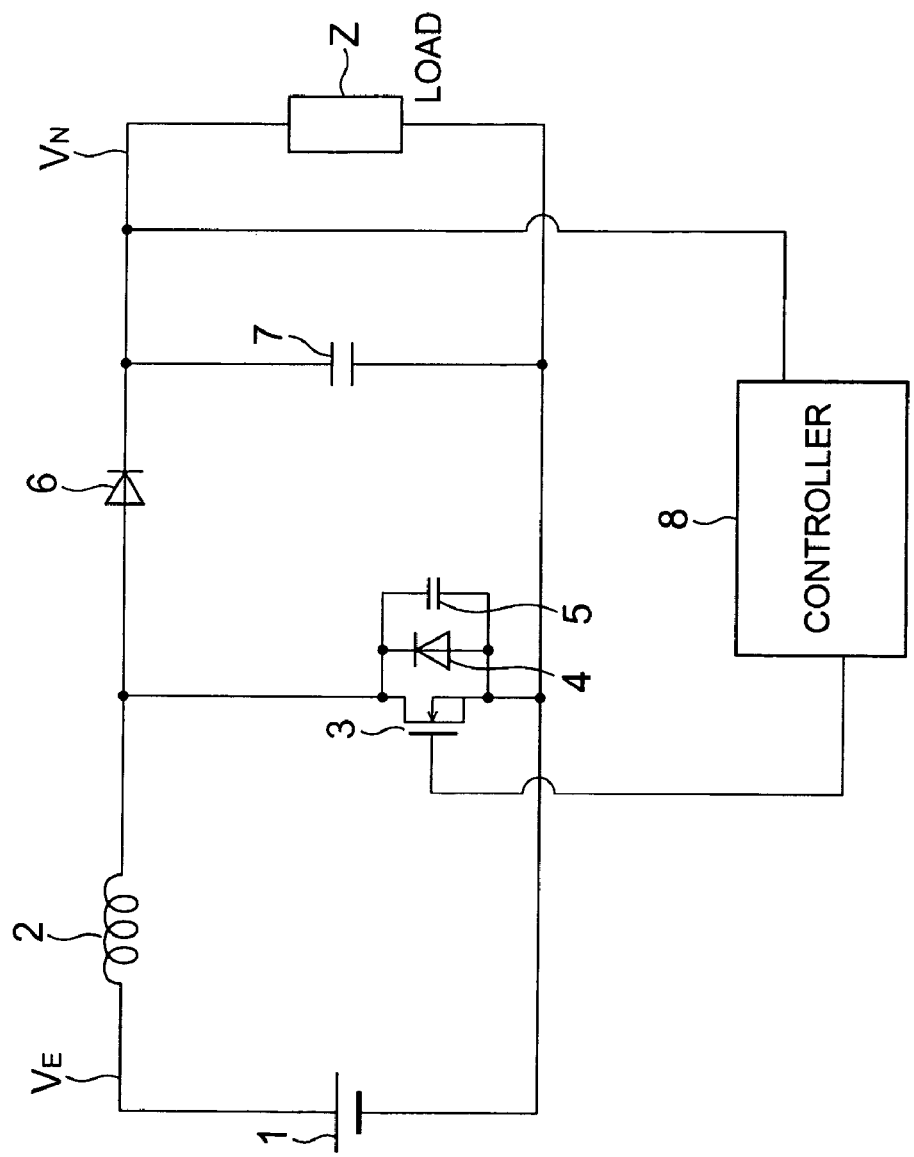
FIG. 1 is a circuit diagram showing the construction of a prior art switching power supply circuit.
Figure 2:
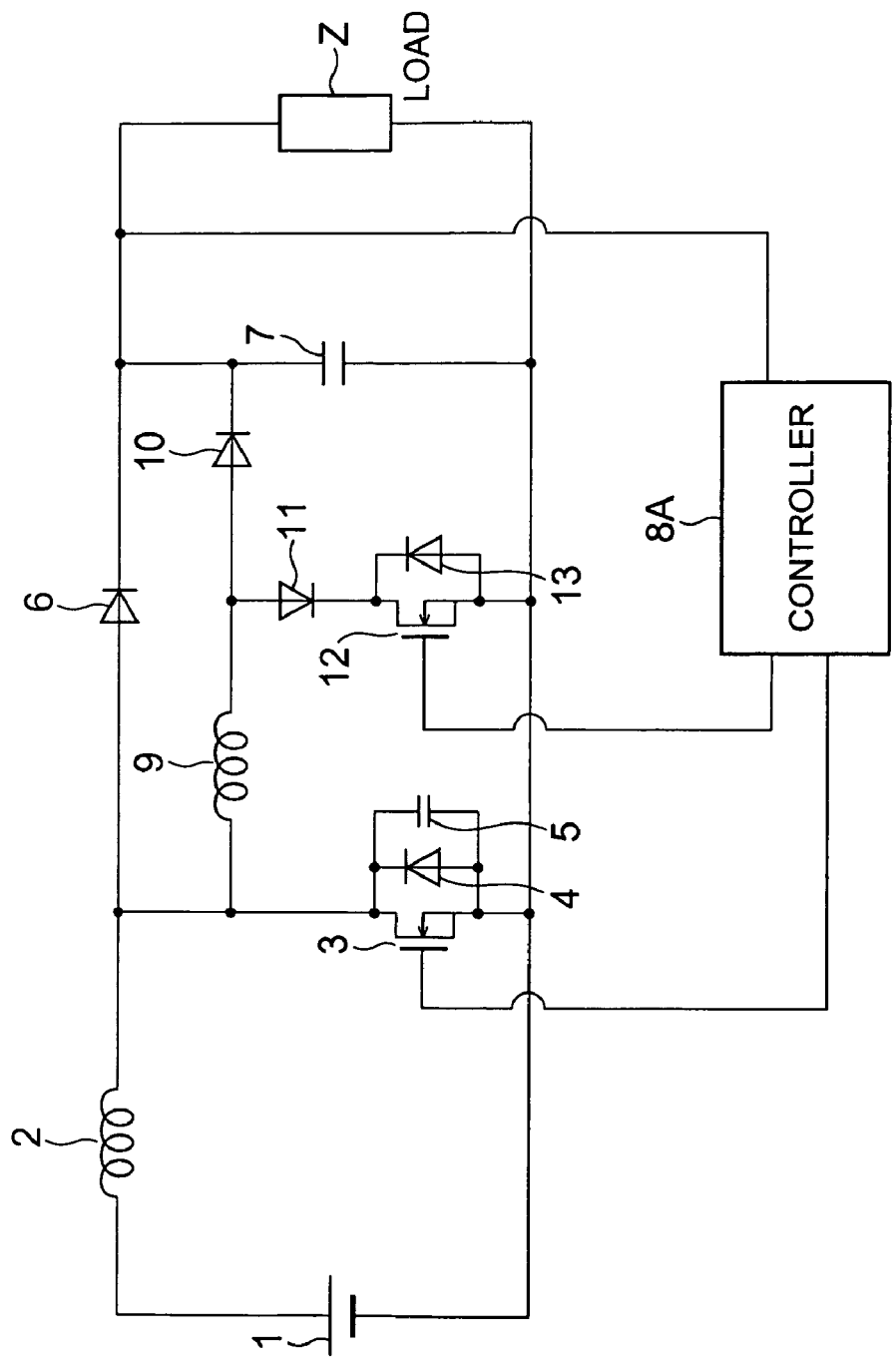
FIG. 2 is a circuit diagram showing the construction of a prior art boost-chopper type switching power supply.
Figure 3:
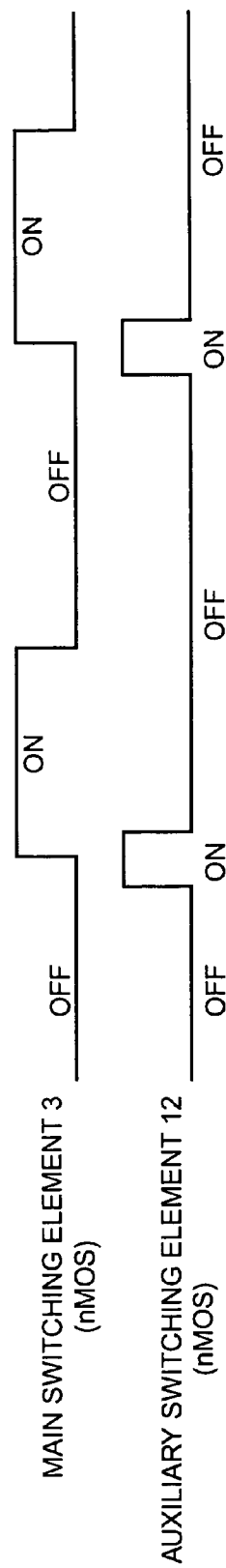
FIG. 3 is a time chart showing ON/OFF states of main and auxiliary switching elements of FIG. 2.
Figure 4:
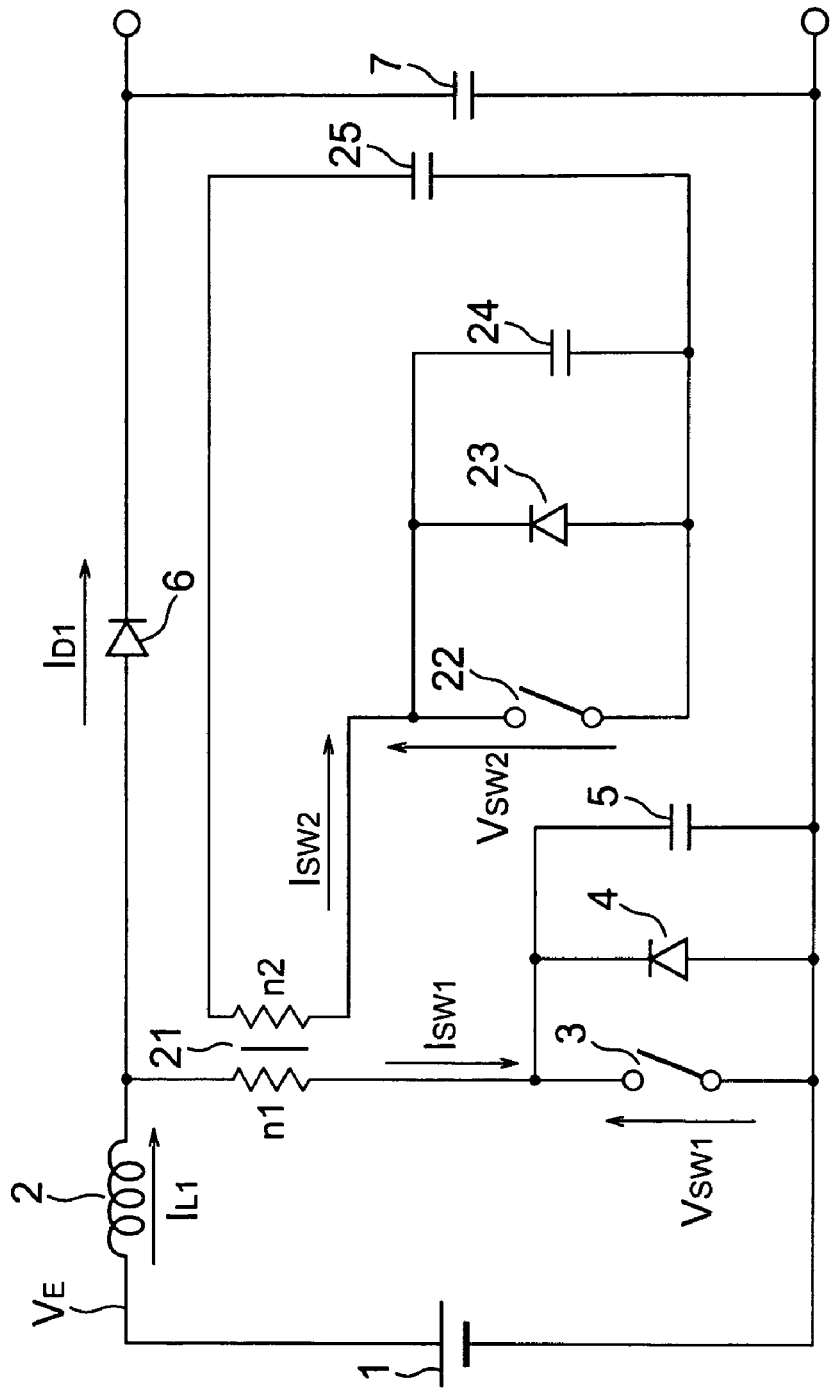
FIG. 4 is a circuit diagram showing the construction of a prior art switching power supply device.
Figure 5:
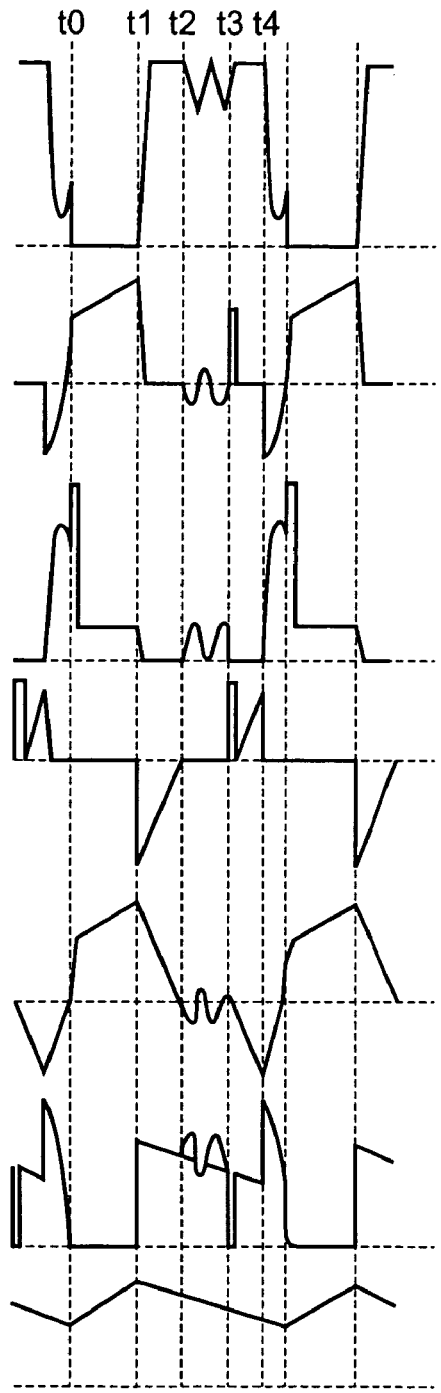
FIGS. 5A to 5G are time charts showing current or voltage waveforms at parts of FIG. 4.
Figure 6:
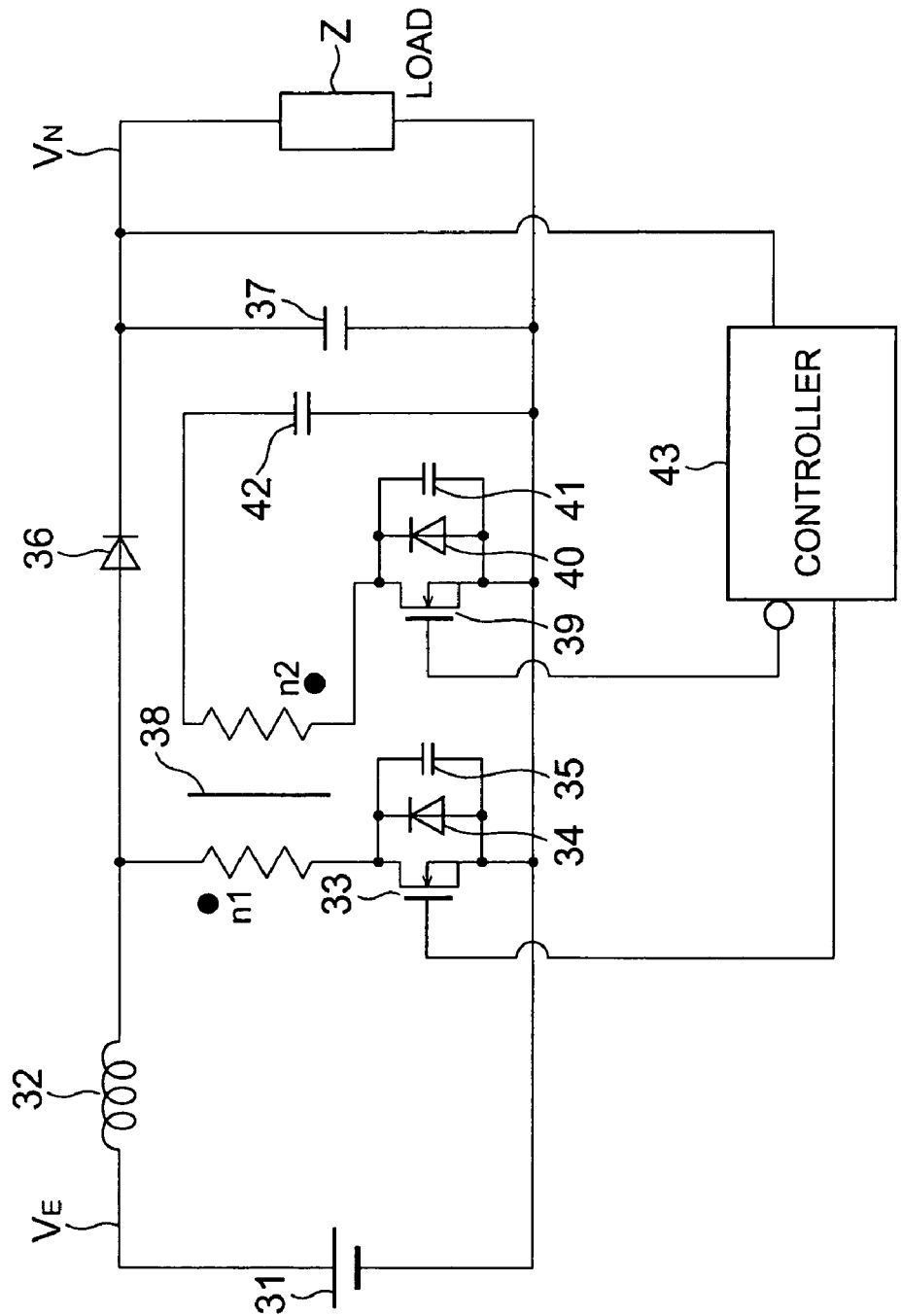
FIG. 6 is a circuit diagram showing the construction of a switching power supply circuit according to a first embodiment of the present invention.

FIG. 6 shows a switching power supply circuit according to a first embodiment of the present invention. Referring to FIG. 6, the switching power supply circuit is made up of a battery 31, a choke coil 32, a switching element 33, a diode 34, a capacitor 35, a rectifier diode 36, a smoothing capacitor 37, a transformer 38, an auxiliary switching element 39, an auxiliary diode 40, an auxiliary capacitor 41, a storing capacitor 42, and a controller 43.

The above components are connected to each other as follows. One end of the choke coil 32 is connected to the positive side of the battery 31. The other end of the choke coil 32 is connected to the anode of the rectifier diode 38. The smoothing capacitor 37 is connected to the cathode of the rectifier diode 36 and the negative side of the battery 31. A load Z is connected to the smoothing capacitor 37 in parallel. A series circuit of the primary winding n1 of the transformer 38 and the switching element 33 is connected to the anode of the rectifier diode 36 and the negative side of the battery 31. A series circuit of the auxiliary switching element 39, the secondary winding n2 of the transformer 38, and the storing capacitor 42 is connected to the negative side of the battery 31 and one end of the smoothing capacitor 37. The controller 43 receives the output voltage $V_N$ of one end of the load Z and outputs control signals to the respective gate electrodes of the switching element 33 and the auxiliary switching element 39. The controller 43 outputs the signals of opposite polarities to the respective switching elements 33 and 39 so as to alternately turn the switching element 33 and the auxiliary switching element 39 on and off.

In this example, either of the switching element 33 and the auxiliary switching element 39 is realized by an nMOS. The diode 34 is realized by a parasitic capacitor of the switching element 33. The diode 34 is connected to both ends of the switching element 33 in parallel such that the forward direction of the diode 34 is reverse to the direction of current flowing in the switching element 33. The capacitor 35 is realized by a parasitic capacitance of the switching element 33. The capacitor 35 is connected to both ends of the switching element 33 in parallel.

The primary winding n1 of the transformer 38 is connected to the switching element 33 in series. Current flowing through the switching element 33 is allowed to flow in the primary winding n1 so that the electromagnetic energy stored in the primary winding n1 is transferred to the secondary winding n2. On the other hand, when current flows in the secondary winding n2, the electromagnetic energy stored in the secondary winding n2 is transferred to the primary winding n1.

When the auxiliary switching element 39 is turned on, the auxiliary switching element 39 allows current to flow from the storing capacitor 42 into the secondary winding n2 of the transformer 38. The auxiliary diode 40 is realized by a parasitic diode of the auxiliary switching element 39. The auxiliary diode 40 is connected to both ends of the auxiliary switching element 39 in parallel such that the forward direction of the auxiliary diode 40 is reverse to the direction of current flowing in the auxiliary switching element 39. The auxiliary capacitor 41 is realized by a parasitic capacitance of the auxiliary switching element 39. The auxiliary capacitor 41 is connected to the auxiliary switching element 39 in parallel.

Resonance current between the storing capacitor 42 and the secondary winding n2 of the transformer 38 flows in the storing capacitor 42, whereby the storing capacitor 42 stores electromagnetic energy supplied from the secondary winding n2.

The controller 43 monitors the output voltage $V_N$ and controls the ON times of the switching element 33 and the auxiliary switching element 39 so that the output voltage $V_N$ is kept substantially constant. Particularly in this embodiment, the controller 43 alternately ON/OFF-controls the switching element 33 and the auxiliary switching element 39 and sets dead times during which both the switching element 33 and the auxiliary switching element 39 are in OFF state.

The above-described transformer 3, auxiliary switching element 39, auxiliary diode 40, auxiliary capacitor 41, storing capacitor 42, and controller 43 constitute a control circuit.

When the switching element 33 changes from OFF state into ON state, the control circuit allows current to flow through the diode 34 in the forward direction and thereby the control circuit turns the diode 34 on and discharges the capacitor 35. The control circuit charges the capacitor 35 when the switching element 33 changes from ON state into OFF state. The control circuit turns the diode 34 off after the switching element 33 changes into OFF state. The control circuit restricts, by the inductance of the primary winding n1 of the transformer 39, the recovery current flowing from the smoothing capacitor 37 through the rectifier diode 36 into the switching element 33 when the switching element 33 changes from OFF state into ON state.

Figure 7:
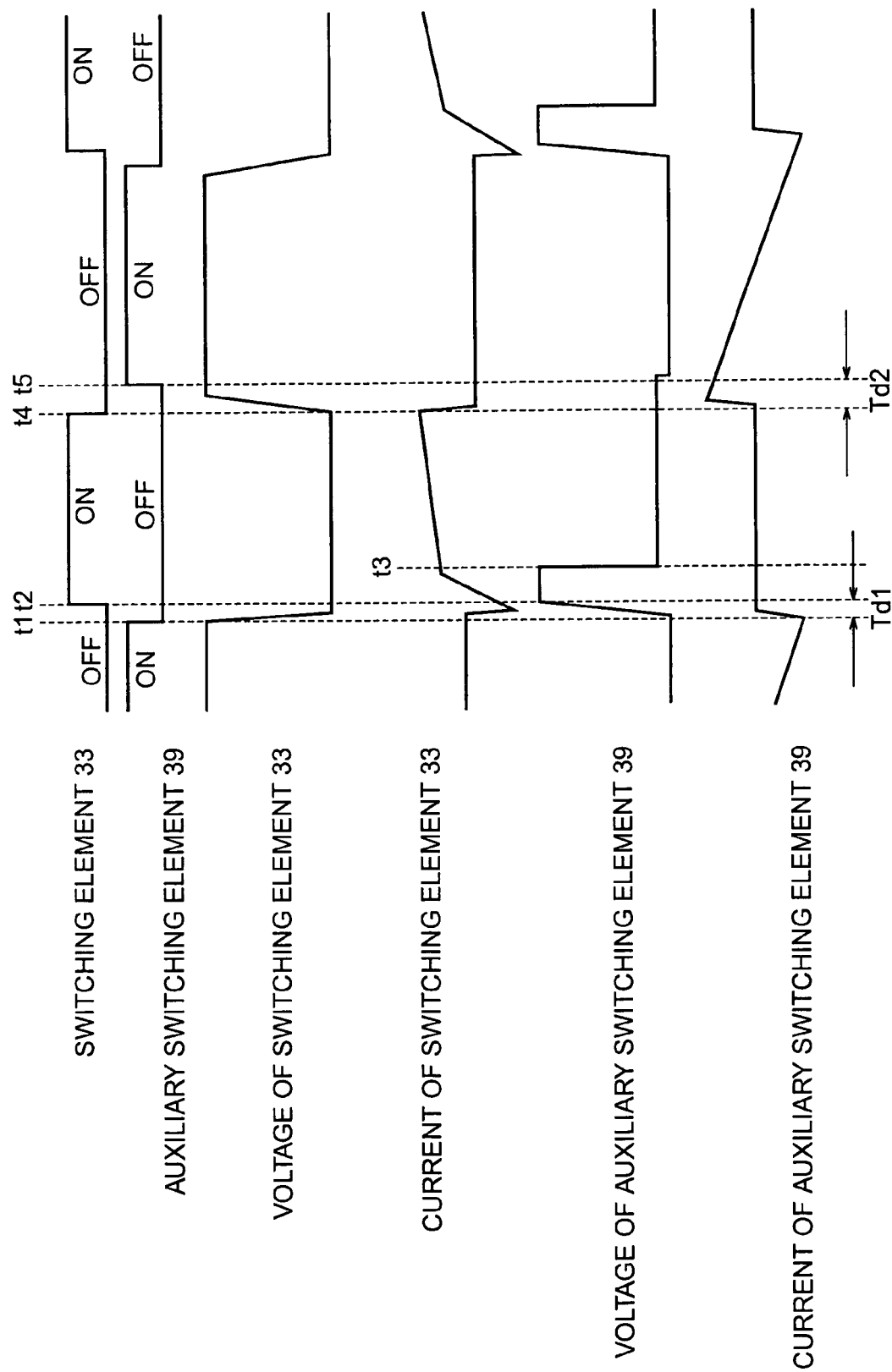
FIG. 7 is a time chart for explaining the operation of the switching power supply circuit of FIG. 6.

FIG. 7 is a time chart for explaining the operation of the switching power supply circuit of FIG. 6. in FIG. 7, the axis of ordinates represents voltage or current and the axis of abscissas represents time.

A control method used in the switching power supply circuit of this embodiment will be described also with reference to FIG. 7.

In this switching power supply circuit, electromagnetic energy supplied from the battery 31 is stored in the choke coil 32 when the switching element 33 is in ON state. Subsequently, when the switching element 33 is turned into OFF state, counter electromotive force generated in the choke coil 32 is superimposed on the output voltage $V_E$ of the battery 31. The superimposed voltage is applied to the smoothing capacitor 37 through the rectifier diode 36. As a result, the output voltage $V_E$ is boosted to generate an output voltage $V_N$.

In this case, as shown in FIG. 7, the switching element 33 and the auxiliary switching element 39 are alternately ON/OFF-controlled and dead times Td1 and Td2 are prepared during which both the switching element 33 and the auxiliary switching element 39 are in OFF state. At time t1, when the switching element 33 is in OFF state, the auxiliary switching element 39 changes from ON state into OFF state. Afterward, in the dead time Td1, charges in the capacitor 35 are released in a moment by electromagnetic energy of the inductance of the primary winding n1 of the transformer 38. Further, exciting current flows through the diode 34 into the transformer 38, the diode 36, and the smoothing capacitor 37 so that the diode 34 is turned into ON state.

When the switching element 33 is turned on at time t2, because the diode 34 connected to the switching element 33 in parallel has been in ON state, switching of the switching element 33 is zero-voltage switching and thus the switching loss is reduced.

On the other hand, when the auxiliary switching element 39 is turned into OFF state at time t1, the auxiliary capacitor 41 connected to the auxiliary switching element 39 in parallel is charged in the dead time Td1. Therefore, because the rising of voltage of the auxiliary switching element 39 becomes dull in comparison with the falling of current flowing in the auxiliary switching element 39, the product of the voltage and current becomes little. Thus, the switching loss in the auxiliary switching element 39 is reduced. At this time, the auxiliary diode 40 is turned into OFF state.

At time t3, the auxiliary diode 40 is turned into ON state by exciting current of the transformer 38, and the auxiliary capacitor 41 is discharged. At time t4, when the auxiliary switching element 39 is in OFF state, the switching element 33 changes from ON state into OFF state. Afterward, in the dead time Td2, the capacitor 35 connected to the switching element 33 in parallel is charged. Therefore, because the rising of voltage of the switching element 33 becomes dull in comparison with the falling of current flowing in the switching element 33, the product of the voltage and current becomes little. Thus, the switching loss in the witching element 33 is reduced. At this time, the diode 34 is turned into OFF state.

At time t5, when the auxiliary switching element 39 changes from OFF state into ON state, the exciting current of the transformer 38 is flowing in the auxiliary diode 40 connected to the auxiliary switching element 39 in parallel and thus the auxiliary diode 40 is in ON state. Therefore, switching or the auxiliary switching element 39 is zero-voltage switching and thus the switching loss in the auxiliary switching element 39 is reduced.

As described above, in the first embodiment, when the switching element 33 changes from ON state into OFF state, the capacitor 35 connected to the switching element 33 in parallel is charged. Therefore, because the rising of voltage of the switching element 33 becomes dull in comparison with the falling of current flowing in the switching element 33, the switching loss is reduced.

In addition, because the diode 34 connected to the switching element 33 in parallel is turned into ON state before the switching element 33 changes from OFF state into ON state, switching of the switching element 33 is zero-voltage switching and thus the switching lose is reduced.

Likewise, when the auxiliary switching element 39 changes from ON state into OFF state, the auxiliary capacitor 41 connected to the auxiliary switching element 39 in parallel is charged. Therefore, because the rising of voltage of the auxiliary switching element 39 becomes dull in comparison with the falling of current flowing in the auxiliary switching element 39, the switching loss is reduced.

In addition, because the auxiliary diode 40 connected to the auxiliary switching element 39 in parallel is turned into ON staff before the auxiliary switching element 39 changes from OFF state into ON state, switching of the auxiliary switching element 39 is zero-voltage switching and thus the switching lose is reduced.

Further, because the recovery current flowing from the smoothing capacitor 37 through the rectifier diode 36 into the switching element 33 when the switching element 33 changes from OFF state into ON state, is restricted by the inductance of the primary winding n1 of the transformer 38, the switching loss is reduced.

[Second Embodiment]

Figure 8:
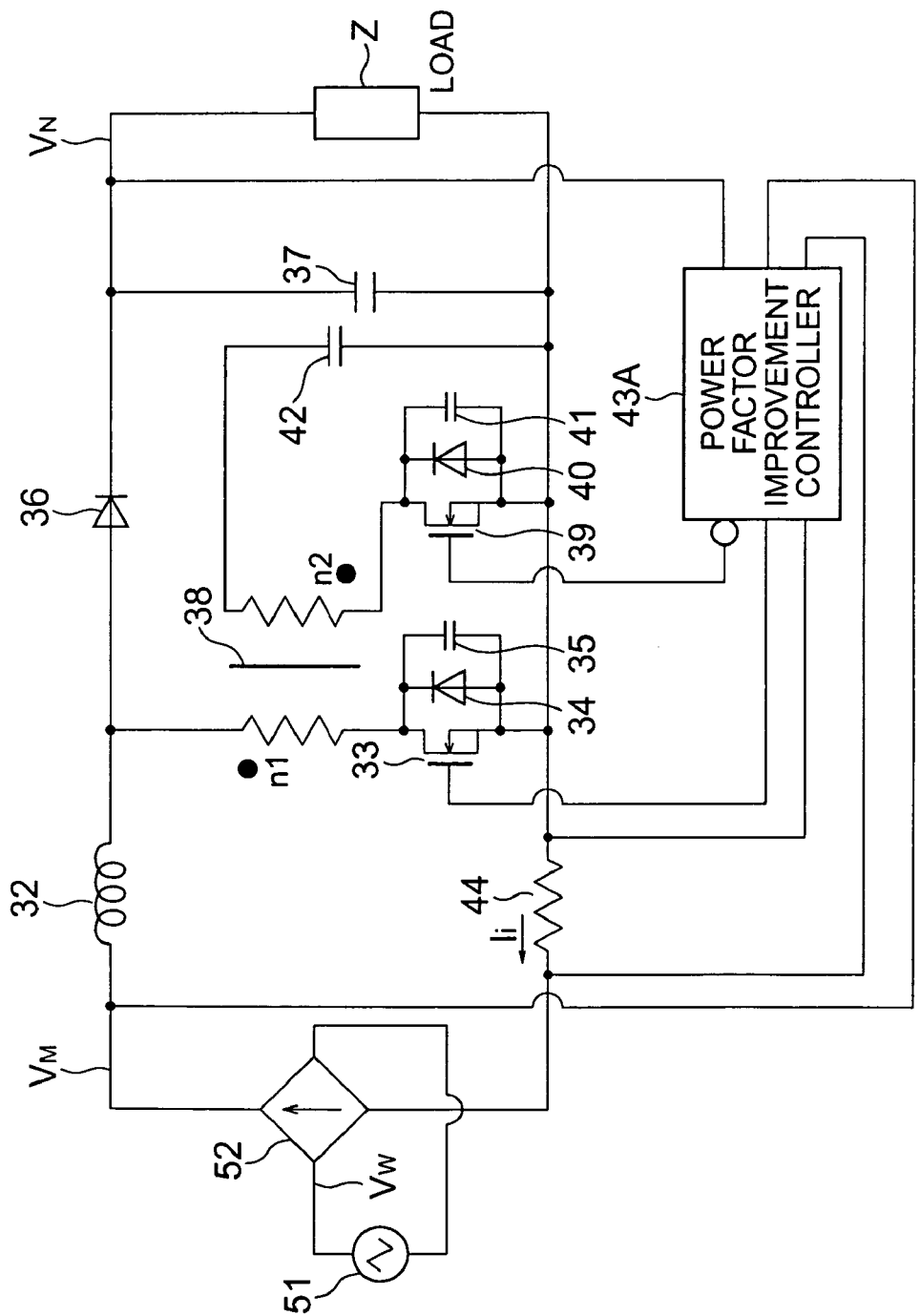
FIG. 8 is a circuit diagram showing the construction of a switching power supply circuit according to a second embodiment of the present invention.

FIG. 8 shows the construction of a switching power supply circuit according to a second embodiment of the present invention. The same components as in the first embodiment of FIG. 6 are denoted by the same reference numerals as in the first embodiment of FIG. 6, respectively.

In this switching power supply circuit, in place of the battery 31 and the controller 43 of FIG. 6, there are provided a commercial AC power supply 51, a rectifier circuit 52, and a power factor improvement controller 43A. In addition, a current detector resistance 44 is connected between the source electrode of the switching element 33 and the rectifier circuit 52.

The rectifier circuit 52 rectifies the input voltage $V_W$ obtained from the commercial AC power supply 51 to generate a pulsating voltage $V_M$. The current detector resistance 44 is for indirectly detecting input current obtained from the commercial AC power supply 51. This detection is carried out by the power factor improvement controller 43A detecting pulsating current Ii output from the rectifier circuit 52. The power factor improvement controller 43A is realized by an integrated circuit for example. The pulsating voltage $V_M$ and the output voltage $V_N$ are also given to the power factor improvement controller 43A. On the basis of the pulsating voltage $V_M$, the output voltage $V_N$, and the pulsating current Ii, the power factor improvement controller 43A controls the ON times of the switching element 33 and the auxiliary switching element 39 so that the above input current has a sine waveform substantially in phase with the input voltage $V_W$. The construction other than the above-described construction is the same as that described with reference to FIG. 6.

In this switching power supply circuit, after the input voltage $V_W$ of, for example, AC 100 V to AC 240 V is applied from the commercial AC power supply 51, the same operation as that of the first embodiment is performed. The output voltage $V_N$ of about DC 360 V is output. The ON times of the switching element 33 and the auxiliary switching element 39 are controlled by the power factor improvement controller 43A. As a result, the input current obtained from the commercial AC power supply 51 becomes a sine wave substantially in phase with the input voltage $V_W$ and thereby the power factor is improved.

As described above, in the second embodiment, the ON times of the switching element 33 and the auxiliary switching element 39 are controlled by the power factor improvement controller 43A so that the input current has a sine wave substantially in phase with the input voltage $V_W$. Therefore, the second embodiment has an advantage of improvement of power factor. In addition to the advantages of the first embodiment.

[Third Embodiment]

Figure 9:
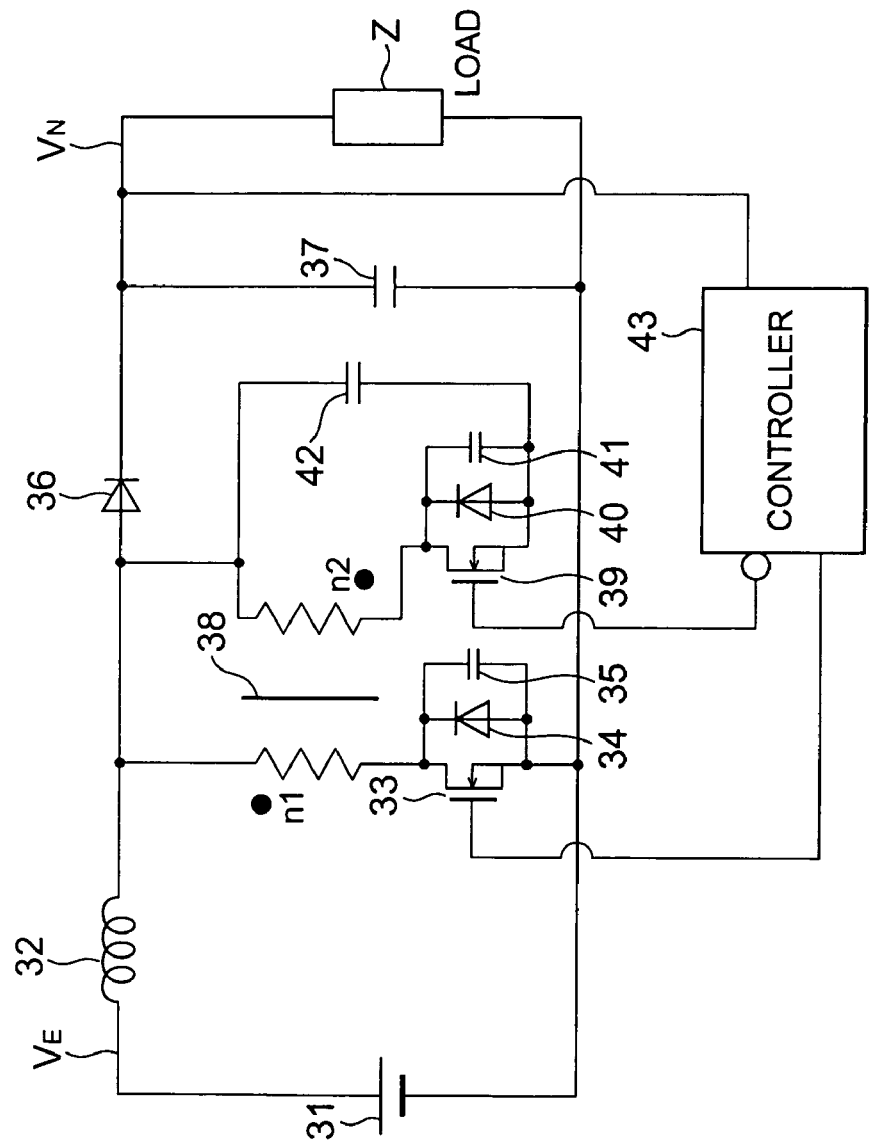
FIG. 9 is a circuit diagram showing the construction of a switching power supply circuit according to a third embodiment of the present invention.

FIG. 9 shows the construction of a switching power supply circuit according to a third embodiment of the present invention. In this switching power supply circuit, one end of the secondary winding n2 of the transformer 38 of FIG. 6 is connected to the anode of the rectifier diode 36. In addition, the source electrode of the auxiliary switching element 39, the anode of the auxiliary diode 40, one end of the auxiliary capacitor 41, and one end of the storing capacitor 42 are connected in common, and they are disconnected from one end of the smoothing capacitor 37. The other construction is the same as that of FIG. 6. This switching power supply circuit performs the same operation as the first embodiment and has the came advantages as the first embodiment.

[Fourth Embodiment]

Figure 10:
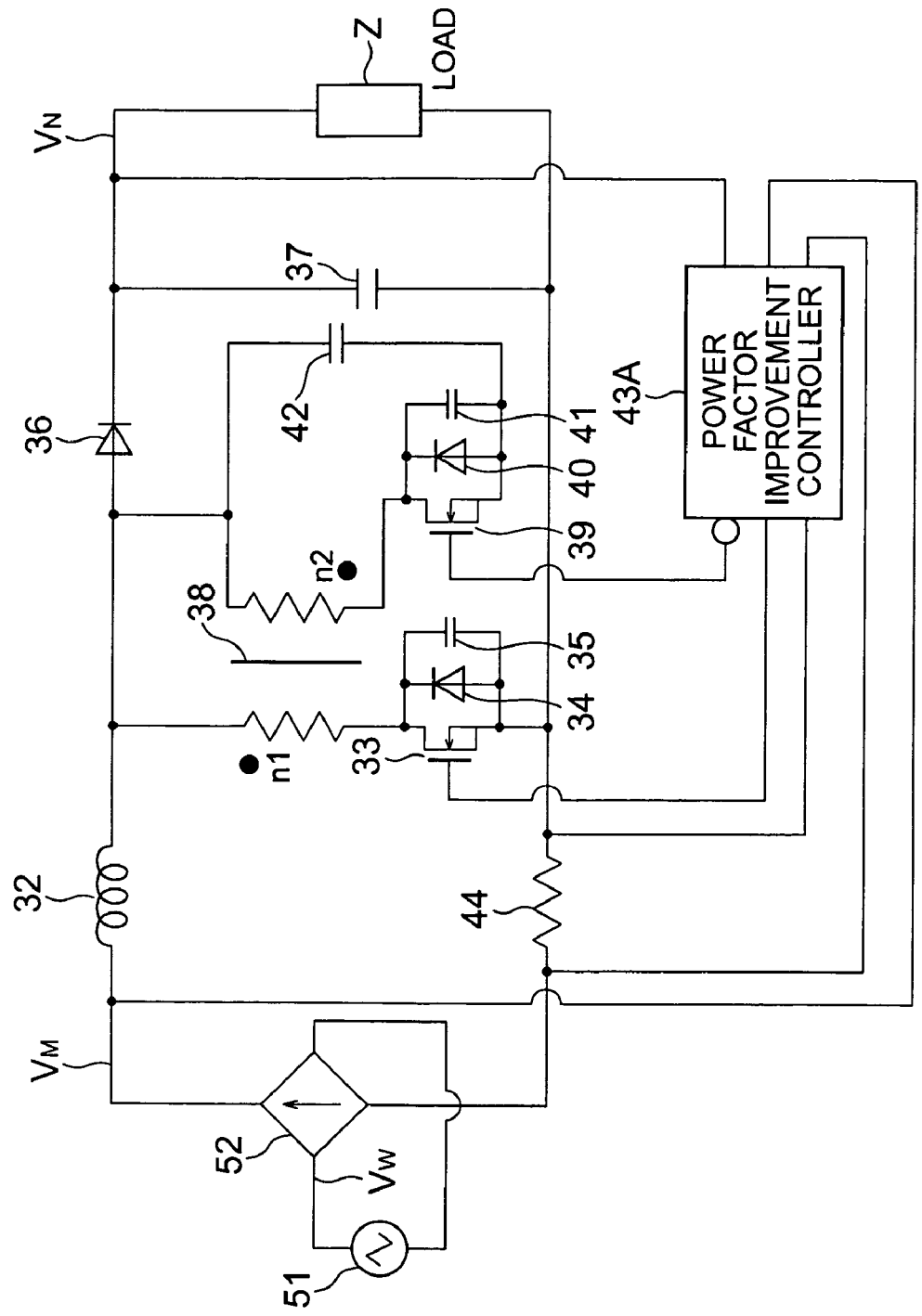
FIG. 10 is a circuit diagram showing the construction of a switching power supply circuit according to a fourth embodiment of the present invention.

FIG. 10 shows the construction of a switching power supply circuit according to a fourth embodiment of the present invention. In this switching power supply circuit, one end of the secondary winding n2 of the transformer 38 of FIG. 8 is connected to the anode of the rectifier diode 36. In addition, the source electrode of the auxiliary switching element 39, the anode of the auxiliary diode 40, one end of the auxiliary capacitor 41, and one end of the storing capacitor 42 are connected in common, and they are disconnected from one end of the smoothing capacitor 37. The other construction is the same as that of FIG. 8. This switching power supply circuit performs the same operation as the second embodiment and has the same advantages as the second embodiment.

Hereinbefore, some embodiments of the present invention have been described with reference to the drawings. However, specific construction is not limited to those embodiments. If changes in design are made without departing from the scope and spirit of the invention, it is included in the invention.

For example, in each embodiment, either of the switching element 33 and the auxiliary switching element 39 is realized by an nMOS. However, it may be realized by a bipolar transistor or an IGBT (Insulated Gate Bipolar Transistor) for example. In such a case, a diode and a capacitor are connected between the emitter and collector of each transistor. In addition, other than the current detector resistance 44 for detecting the pulsating current Ii, a current sensor may be used that indirectly detects the pulsating current Ii by detecting a magnetic field generated around the wire material through which the pulsating current Ii flows.

As described above, according to the present invention, when the switching element changes from ON state into OFF state, the capacitor element connected to the switching element is charged. Therefore, because the rising of voltage of the switching element becomes dull in comparison with the falling of current flowing in the switching element, the switching loss can be reduced. In addition, because the rectifying element connected to the switching element is turned into ON state before the switching element changes from OFF state into ON state, switching of the switching element is zero-voltage switching and thus the switching loss can be reduced. Likewise, when the auxiliary switching element changes from ON state into OFF state, the auxiliary capacitor element connected to the auxiliary switching element is charged. Therefore, because the rising of voltage of the auxiliary switching element becomes dull in comparison with the falling of current flowing in the auxiliary switching element, the switching loss can be reduced. In addition, because the auxiliary rectifying element connected to the auxiliary switching element is turned into ON state before the auxiliary switching element changes from OFF state into ON state, switching of the auxiliary switching element is zero-voltage switching and thus the switching loss can be reduced. Further, because the recovery current flowing from the smoothing capacitor through the rectifier diode into the switching element when the switching element changes from OFF state into ON state, is restricted by the control circuit, the switching loss can be reduced. Further, because the ON times of the switching element and the auxiliary switching element are controlled by the power factor improvement controller so that the input current has a sine waveform substantially in phase with the input voltage, the power factor can be improved.

What is claimed is:

1. A switching power supply circuit comprising:
   a switching element;
   an inductance element for storing electromagnetic energy supplied from a DC power supply unit when said switching element is in ON state, in which counter electromotive force generated in said inductance element when said switching element is turned into OFF state is superimposed on an output voltage of said DC power supply unit;
   rectifying means;
   smoothing means to which the superimposed voltage is applied through said rectifying means to boost the output voltage of said DC power supply unit;
   a rectifying element connected to both ends of said switching element such that the forward direction of said rectifying element is reverse to the direction of current flowing in said switching element;
   a capacitance element connected to both ends of said switching element; and
   a control circuit which allows current to flow through said rectifying element in the forward direction to turn said rectifying element on and discharges said capacitance element before said switching element changes from OFF state into ON state, charges said capacitance element and turns said rectifying element off when said switching element changes from ON state into OFF state, and restricts recovery current flowing from said smoothing means through said rectifying means into said switching element when said switching element changes from OFF state into ON state.

2. The switching power supply circuit according to claim 1, wherein
   said control circuit includes a transformer having a primary winding and a secondary winding, and
   current flowing through said switching element flows in said primary winding, and said transformer transfers electromagnetic energy stored in said primary winding to said secondary winding, and transfers electromagnetic energy stored in said secondary winding to said primary winding when current flows in said secondary winding, and said control circuit further includes:
   storing means for storing electromagnetic energy supplied from said secondary winding, said storing means allowing resonance current to flow between said storing means and said secondary winding of said transformer;
   an auxiliary switching element allowing current to flow from said storing means into said secondary winding of said transformer when said auxiliary switching element is turned into ON state;
   an auxiliary rectifying element connected to both ends of said auxiliary switching element such that the forward direction of said auxiliary rectifying element is reverse to the direction of current flowing in said auxiliary switching element;
   an auxiliary capacitance element connected to both ends of said auxiliary switching element; and
   a controller for alternately ON/OFF-controlling said switching element and said auxiliary switching element in accordance with said output voltage, and setting a dead time period during which both said switching element and said auxiliary switching element are in OFF state.

3. The switching power supply circuit according to claim 1, wherein
   said switching element is realized by an MOS transistor,
   said rectifying element is realized by a parasitic diode of said MOS transistor, and
   said capacitance element is realized by a parasitic capacitance of said MOS transistor.

4. The switching power supply circuit according to claim 2, wherein
   said auxiliary switching element is realized by an MOS transistor,
   said auxiliary rectifying element is realized by a parasitic diode of said MOS transistor, and
   said auxiliary capacitance element is realized by a parasitic capacitance of said MOS transistor.

5. The switching power supply circuit according to claim 2, wherein
   said DC power supply unit includes a rectifier circuit for rectifying an input voltage obtained by a commercial AC power supply to generate a pulsating voltage,
   said control circuit further includes current detecting means for detecting input current obtained from said commercial AC power supply, and
   said control circuit comprises, in place of said controller, a power factor improvement controller for controlling the ON times of said switching element and said auxiliary switching element on the basis of said pulsating voltage, said output voltage, and said input current so that said input current has a sine waveform substantially in phase with said input voltage.

6. A control method used in a switching power supply circuit, comprising the steps of:
   storing electromagnetic energy supplied from a DC power supply unit in an inductance element when a switching element is in ON state;
   superimposing counter electromotive force generated in said inductance element when said switching element is turned into OFF state on an output voltage of said DC power supply unit;
   applying the superimposed voltage to smoothing means through rectifying means to boost the output voltage of said DC power supply unit; connecting a rectifying element to both ends of said switching element such that the forward direction of said rectifying element is reverse to the direction of current flowing in said switching element;

connecting a capacitance element to both ends of said switching element;

making current to flow through said rectifying element in the forward direction to turn said rectifying element on;

discharging said capacitance element before said switching element changes from OFF state into ON state, said capacitance element is charged and said rectifying element is turned off when said switching element changes from ON state into OFF state; and restricting recovery current flowing from said smoothing means through said rectifying means into said switching element when said switching element changes from OFF state into ON state.

7. The control method according to claim 6, further comprising the steps of:

providing a transformer that has a primary winding in which current flowing through said switching element flows, said transformer transferring electromagnetic energy stored in said primary winding to a secondary winding, and transferring electromagnetic energy stored in said secondary winding to said primary winding when current flows in said secondary winding;

providing storing means for storing electromagnetic energy supplied from said secondary winding, said storing means allowing resonance current to flow between said storing means and said secondary winding of said transformer;

providing an auxiliary switching element that allows current to flow from said storing means into said secondary winding of said transformer when said auxiliary switching element is turned into ON state;

providing an auxiliary rectifying element that is connected to both ends of said auxiliary switching element such that the forward direction of said auxiliary rectifying element is reverse to the direction of current flowing in said auxiliary switching element;

providing an auxiliary capacitance element that is connected to both ends of said auxiliary switching element;

providing a controller for alternately ON/OFF-controlling said switching element and said auxiliary switching element, and setting a dead time period during which both said switching element and said auxiliary switching element are in OFF state;

turning on said auxiliary rectifying element and discharging said auxiliary capacitance element before said auxiliary switching element changes from OFF state into ON state; and charging said auxiliary capacitance element and turning off said auxiliary rectifying element when said auxiliary switching element changes from ON state into OFF state.

8. The switching power supply circuit according to claim 2, wherein said switching element is realized by an MOS transistor, said rectifying element is realized by a parasitic diode of said MOS transistor, and said capacitance element is realized by a parasitic capacitance of said MOS transistor.

* * * * *